US010907567B2

(12) United States Patent
Pohlkamp et al.

(10) Patent No.: US 10,907,567 B2
(45) Date of Patent: Feb. 2, 2021

(54) SYSTEM AND METHOD FOR OPERATING A FUEL INJECTOR

(71) Applicant: Ford Global Technologies, LLC, Dearborn, MI (US)

(72) Inventors: Kyle Pohlkamp, Brighton, MI (US); Eric Kurtz, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 114 days.

(21) Appl. No.: 16/022,559

(22) Filed: Jun. 28, 2018

(65) Prior Publication Data
US 2019/0203658 A1    Jul. 4, 2019

Related U.S. Application Data

(60) Provisional application No. 62/613,276, filed on Jan. 3, 2018.

(51) Int. Cl.
| | |
|---|---|
| *F02D 41/00* | (2006.01) |
| *F02D 41/40* | (2006.01) |
| *F02M 51/06* | (2006.01) |
| *F02D 28/00* | (2006.01) |
| *F02M 61/10* | (2006.01) |
| *F02D 41/20* | (2006.01) |
| *F02D 41/38* | (2006.01) |

(52) U.S. Cl.
CPC ......... *F02D 41/402* (2013.01); *F02D 28/00* (2013.01); *F02D 41/2096* (2013.01); *F02M 51/0603* (2013.01); *F02M 61/10* (2013.01); *F02D 41/403* (2013.01); *F02D 41/405* (2013.01); *F02D 2041/389* (2013.01)

(58) Field of Classification Search
CPC ............. F02M 41/402; F02M 41/2096; F02M 41/403; F02M 41/405; F02M 61/10; F02M 51/0603; F02D 2041/389
See application file for complete search history.

(56) References Cited

U.S. PATENT DOCUMENTS

| | | | | |
|---|---|---|---|---|
| 6,079,641 A * | 6/2000 | Shinogle | ................ | F02M 45/04 239/533.4 |
| 6,213,098 B1 * | 4/2001 | Kato | ...................... | F02M 45/08 123/300 |
| 6,912,998 B1 * | 7/2005 | Rauznitz | ............. | F02D 41/2096 123/490 |

(Continued)

FOREIGN PATENT DOCUMENTS

EP      1139443 A1    10/2000

OTHER PUBLICATIONS

Fuel Injection control #2 2008.*

*Primary Examiner* — Phutthiwat Wongwian
*Assistant Examiner* — Sherman D Manley
(74) *Attorney, Agent, or Firm* — Geoffrey Brumbaugh McCoy Russell LLP

(57) ABSTRACT

Methods and systems for operating a direct fuel injector of an internal combustion engine are described. In one example, a nozzle needle is moved in two directions to maintain fuel flow through the direct fuel injector and to reduce the possibility of the nozzle needle impacting a piezoelectric actuator. The method and system may permit long fuel injection times without causing undesirable impacts between components of a fuel injector.

17 Claims, 6 Drawing Sheets

(56) References Cited

U.S. PATENT DOCUMENTS

| | | | | |
|---|---|---|---|---|
| 6,951,204 | B2* | 10/2005 | Shafer | F02M 57/023 |
| | | | | 123/445 |
| 7,509,946 | B2* | 3/2009 | Cooke | F02D 41/2096 |
| | | | | 123/498 |
| 2001/0023686 | A1* | 9/2001 | Okamoto | F02D 41/20 |
| | | | | 123/490 |
| 2007/0290573 | A1* | 12/2007 | Sykes | H02N 2/067 |
| | | | | 310/311 |
| 2009/0063016 | A1* | 3/2009 | Nakata | F02D 41/2096 |
| | | | | 701/103 |
| 2009/0090333 | A1* | 4/2009 | Spadafora | F02D 41/2096 |
| | | | | 123/494 |
| 2009/0179088 | A1* | 7/2009 | Mochizuki | F02D 41/2096 |
| | | | | 239/584 |
| 2009/0294550 | A1* | 12/2009 | Hardy | F02D 41/2096 |
| | | | | 239/102.2 |
| 2013/0019842 | A1* | 1/2013 | Shaver | F02M 51/0603 |
| | | | | 123/478 |
| 2013/0327301 | A1* | 12/2013 | Brandt | F02M 63/00206 |
| | | | | 123/478 |
| 2014/0326218 | A1* | 11/2014 | Ru e | F02D 41/3005 |
| | | | | 123/478 |
| 2015/0096539 | A1* | 4/2015 | Leblon | H01L 41/042 |
| | | | | 123/478 |
| 2016/0201594 | A1* | 7/2016 | Matsubara | F02D 41/38 |
| | | | | 123/299 |
| 2016/0252041 | A1* | 9/2016 | Harada | F02B 23/101 |
| | | | | 123/299 |
| 2017/0058793 | A1* | 3/2017 | Harada | F02M 45/12 |
| 2018/0058366 | A1* | 3/2018 | Nagasawa | F02B 17/005 |
| 2019/0063358 | A1* | 2/2019 | Watanabe | F02M 47/027 |

* cited by examiner

SYSTEM AND METHOD FOR OPERATING A FUEL INJECTOR

CROSS REFERENCE TO RELATED APPLICATIONS

The present application claims priority to U.S. Provisional Application No. 62/613,276, entitled "SYSTEM AND METHOD FOR OPERATING A FUEL INJECTOR" and filed on Jan. 3, 2018. The entire contents of the above-listed application are hereby incorporated by reference for all purposes.

BACKGROUND/SUMMARY

A diesel fuel injector may inject fuel multiple times to a cylinder of an engine during a cycle of the cylinder. The fuel injections may comprise pilot fuel injections, a main fuel injection, and post fuel injections. There may be several pilot fuel injections during a cylinder cycle and these pilot fuel injections may be short in duration. The pilot fuel injections may help to reduce combustion noise and engine HC and CO emissions. Pilot fuel injections may be followed by a main fuel injection. The main fuel injection may be much longer in duration than the pilot fuel injections since fuel in the main fuel injection may provide a substantial amount of the energy used by the engine to create torque. The post fuel injections may also be relatively short in duration as compared to the main fuel injection. The post fuel injections may be used to improve performance of exhaust after treatment devices and particulate emission.

Because pilot, main, and post fuel injections may be useful to meet engine emissions, performance, and noise objectives, it may be desirable for the diesel fuel injector to accurately supply small and large amounts of fuel. One type of diesel fuel injector uses a piezoelectric actuator to precisely time fuel injector opening events and closing events. The piezoelectric actuator expands when electric current is applied to the piezoelectric actuator in a first direction, and the piezoelectric actuator contracts when electric current is applied to the piezoelectric actuator in a second direction. The fuel injector injects fuel or prevents fuel injection depending on the state of the piezoelectric actuator. The piezoelectric actuator is also hydraulically coupled to a nozzle needle that opens and closes the fuel injector via a hydraulic coupling. The fuel injector nozzle needle travels away from a nozzle needle seat and toward the piezoelectric actuator when the fuel injector is commanded open. If the fuel injector is command to open without providing a command to close the fuel injector within a predetermined amount of time, the position of the nozzle needle may not follow a desired trajectory. Consequently, the actual amount of fuel injected may not match the desired amount of fuel to be injected. The discrepancy between the actual amount of fuel injected and the desired amount of fuel injected may be due to an impact between components within the fuel injector. Thus, for long duration main fuel injections, it may be possible for the fuel injector to inject a fuel amount that is different from the desired fuel amount. Consequently, it may be desirable to provide a way of injecting fuel for longer durations without sacrificing accuracy in the amount of fuel injected.

The inventors herein have recognized the above-mentioned disadvantages and have developed a fuel injector operating method, comprising: commanding a fuel injector open a plurality of times before contacting a nozzle needle to a nozzle needle seat during a cycle of a cylinder.

By commanding a fuel injector to open a plurality of times before contacting a nozzle needle of the fuel injector to a nozzle needle seat during a cycle of a cylinder, it may be possible to provide the technical result of extending the fuel injector opening time to increase the amount of fuel injected without sacrificing the accuracy of the amount of fuel injected. In particular, the fuel injector may be commanded open a plurality of times during a cycle of a cylinder while also being commanded to close a plurality of times during the cylinder cycle such that the fuel injector nozzle needle remains open without the nozzle needle impacting other components within the fuel injector (e.g., the piezoelectric actuator) or the nozzle needle seat. The nozzle needle position may advance and retract in a way that allows the nozzle needle to not obstruct fuel flow through the fuel injector until the fuel injector is commanded off for a duration (e.g., amount of time) that allows the nozzle needle to remain in contact against the nozzle needle seat.

The present description may provide several advantages. In particular, the approach may improve fuel injector control and fuel delivery accuracy for long duration fuel injections. In addition, the approach allows a fuel injector to inject small or large amounts of fuel in a sole fuel pulse. Further, the approach may reduce engine emissions and provide uniform engine torque production from cylinder cycle to cylinder cycle.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
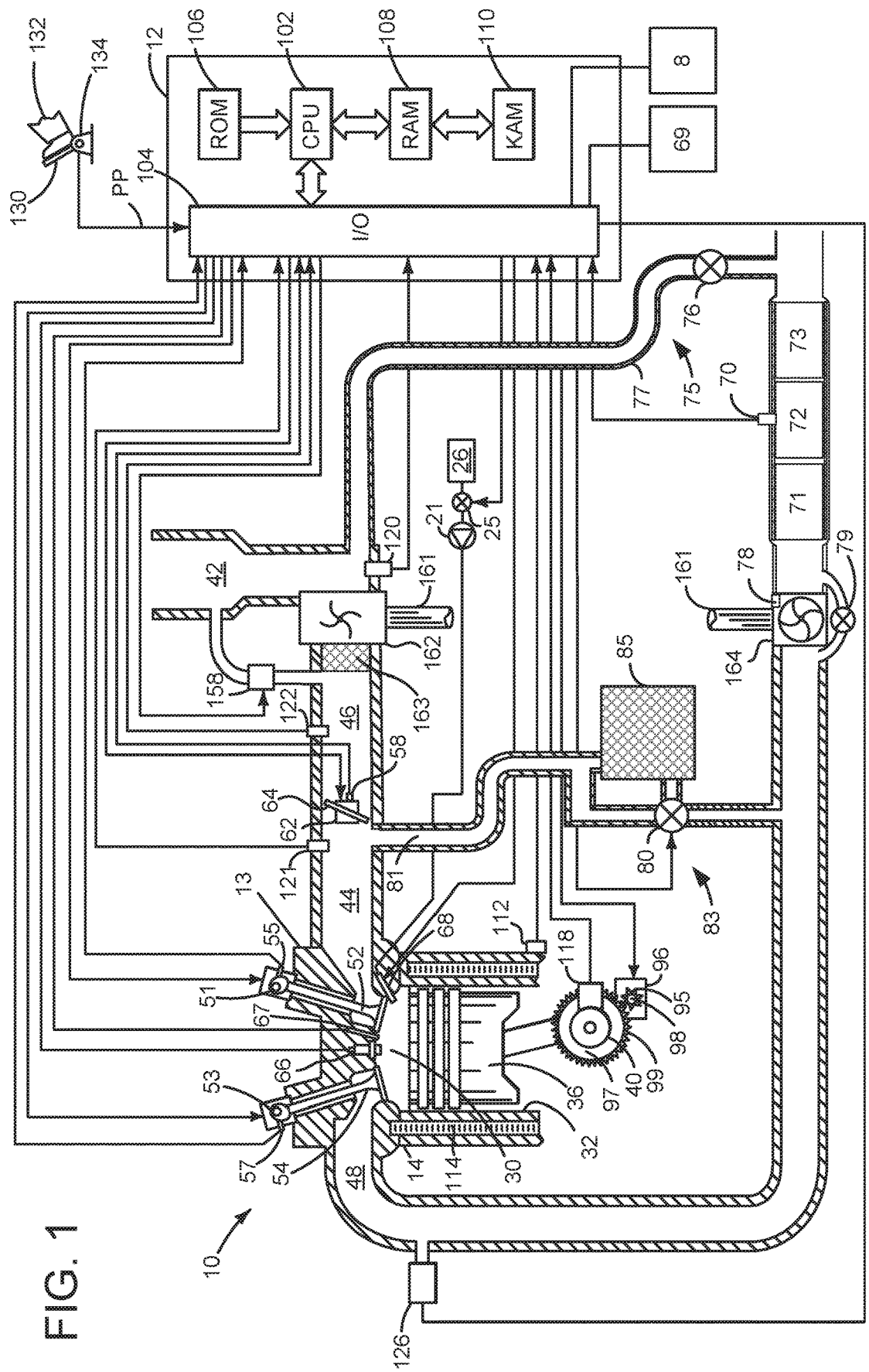
FIG. 1 shows a schematic depiction of an example engine.
Figure 3:
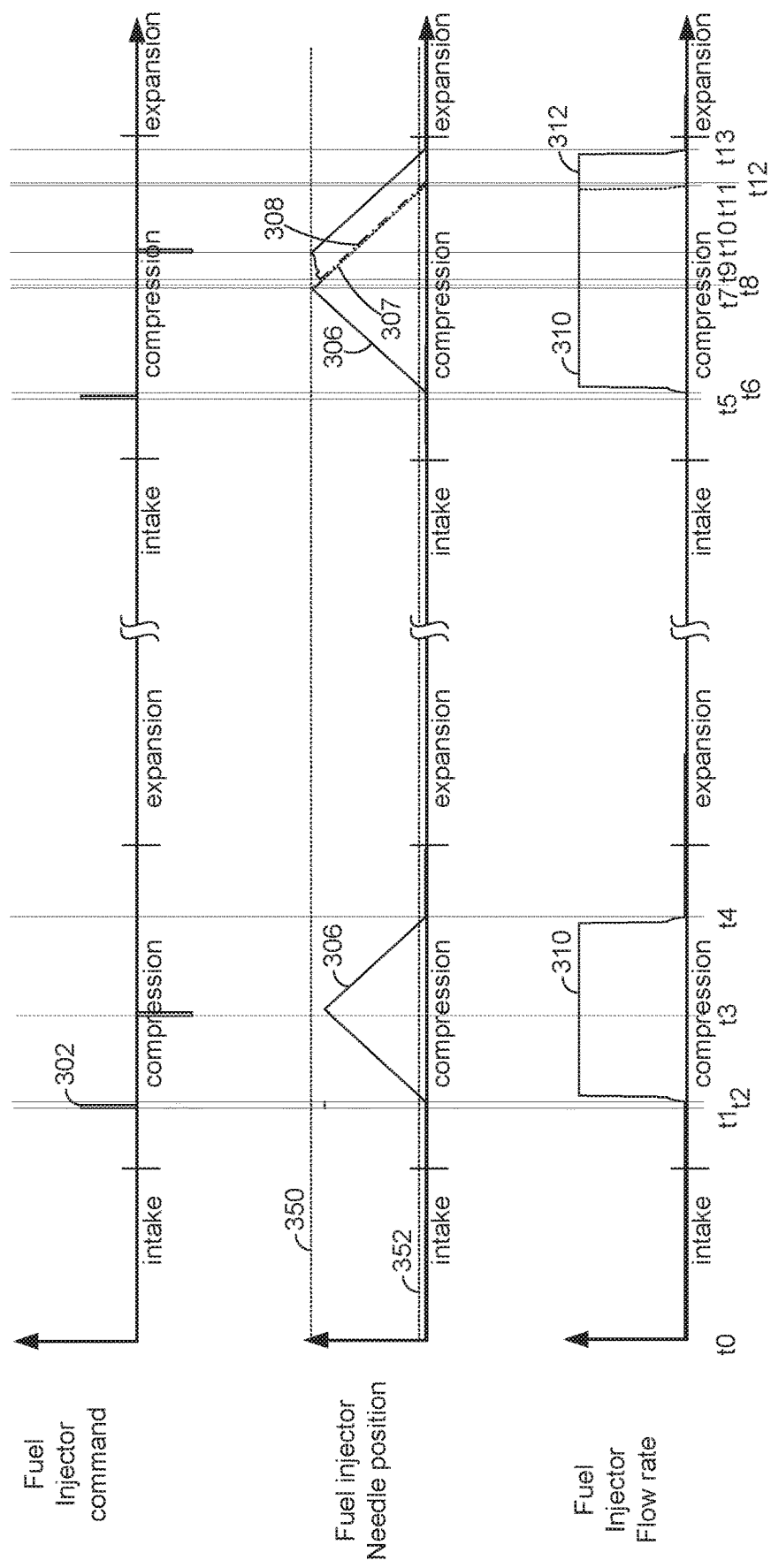
FIG. 3 shows a prior art operating sequence for operating the fuel injector shown in FIG. 2.
Figure 4:
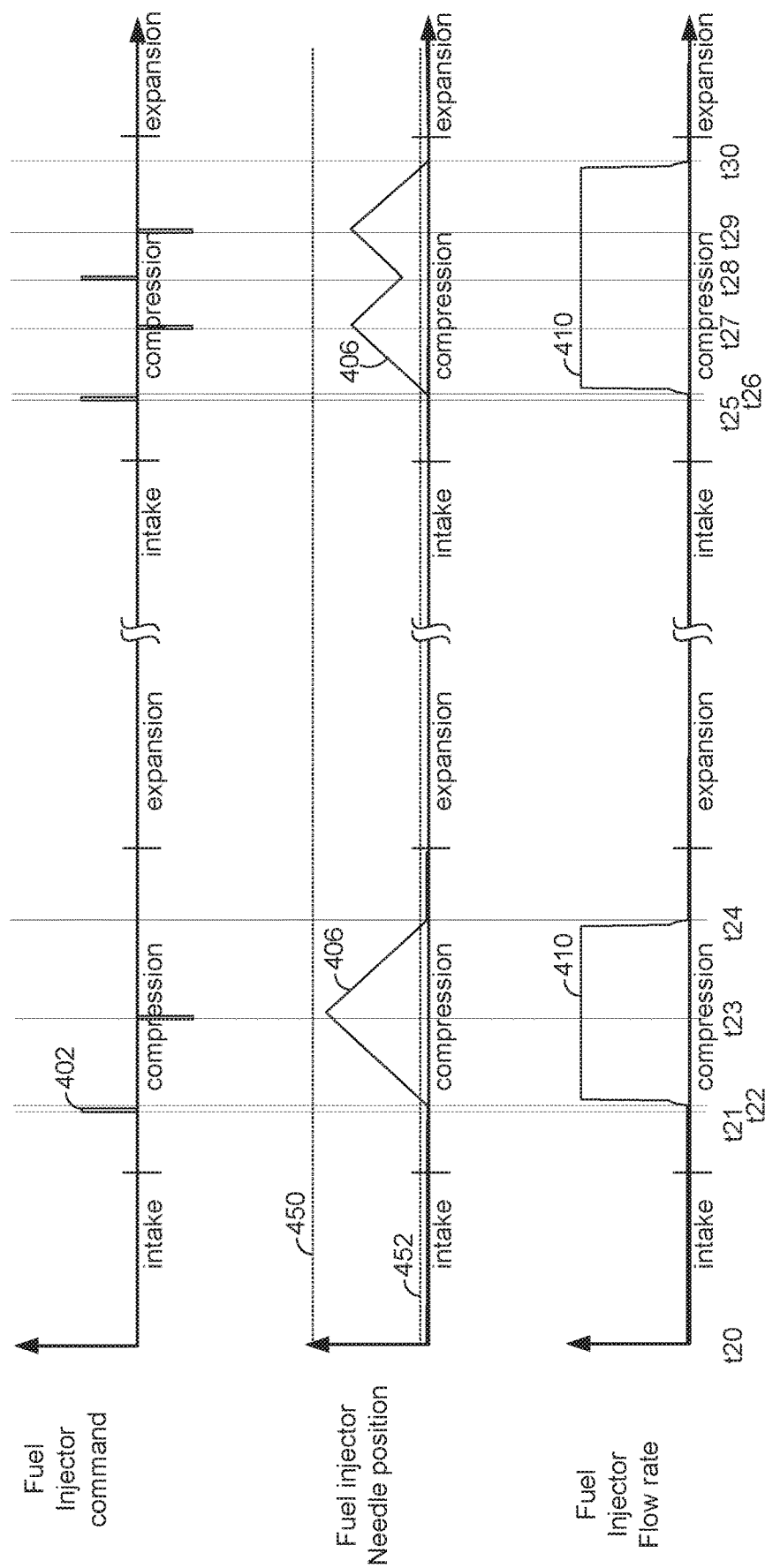
FIG. 4 shows an operating sequence for operating the fuel injector shown in FIG. 2 according to the method of FIG. 5.
Figure 5:
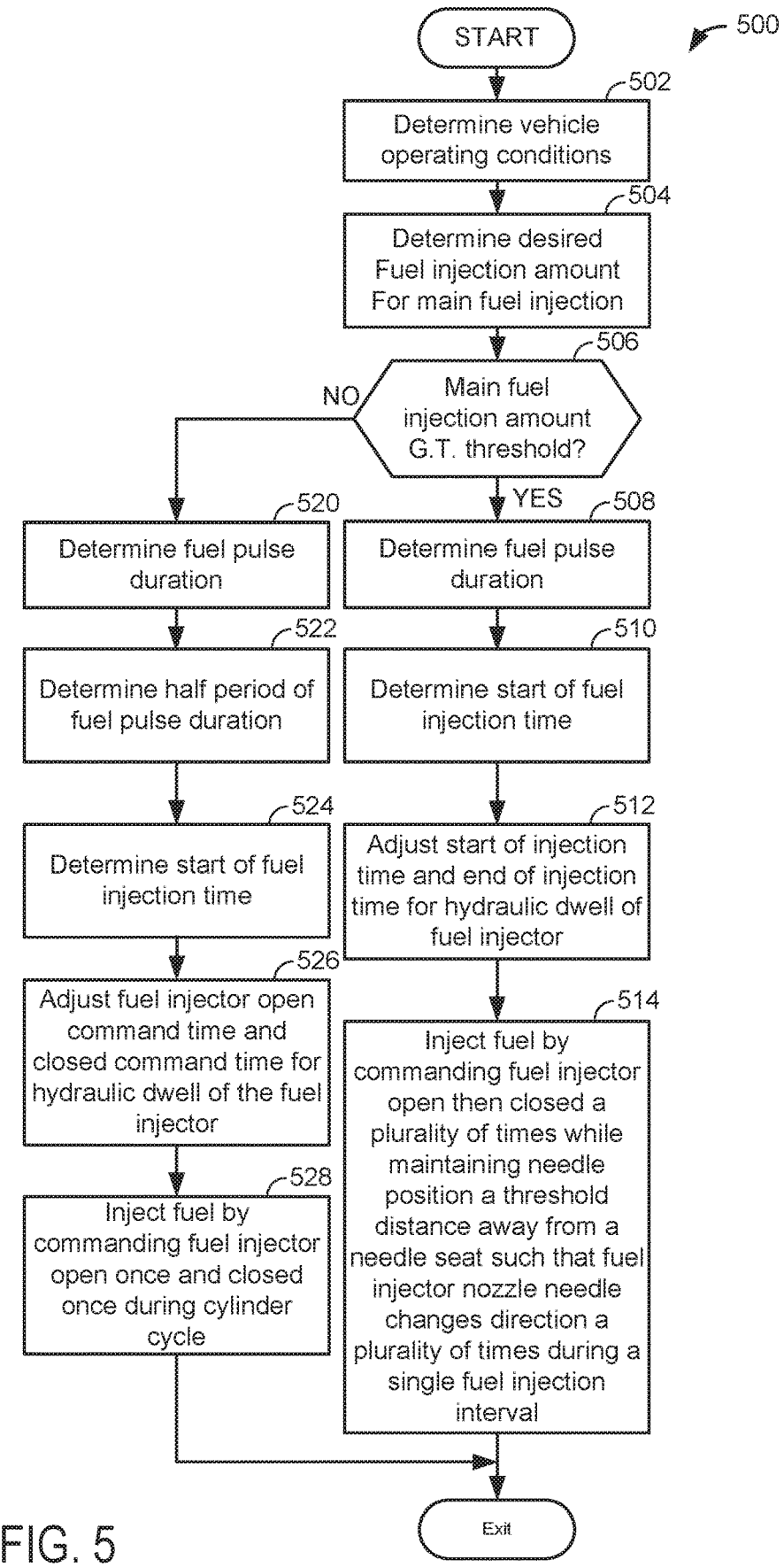
FIG. 5 shows an example method for operating an engine that includes a direct fuel injector.
Figure 6:
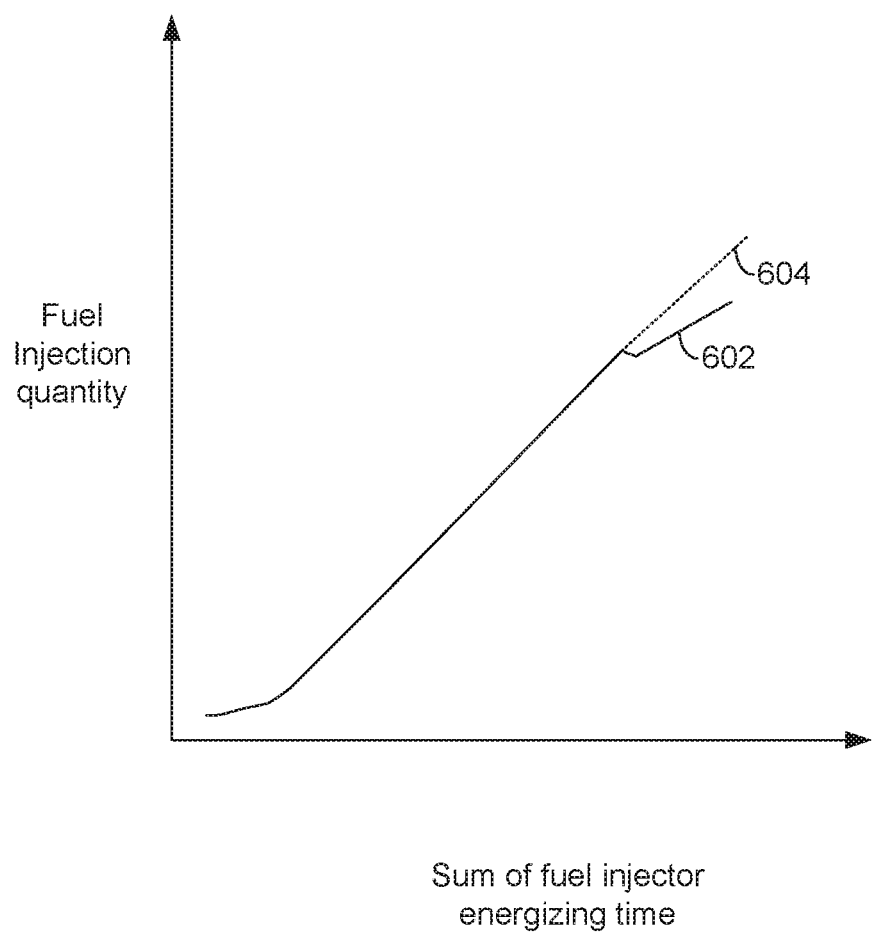
FIG. 6 shows a plot of fuel injection quantity versus fuel injector energization time.

The present description is related to operating a diesel engine that includes a direct fuel injector as shown in FIG. 1. The fuel injector may be of the type shown in FIG. 2. A prior art fuel injector operating sequence is shown in FIG. 3. A fuel injector operating sequence according to the present description is shown in FIG. 4. A method for operating a direct fuel injector and an engine is shown in FIG. 5. A plot showing injected fuel quantity versus fuel injector energization time is shown in FIG. 6.

Referring to FIG. 1, internal combustion engine 10, comprising a plurality of cylinders, one cylinder of which is shown in FIG. 1, is controlled by electronic engine controller 12. The controller 12 receives signals from the various sensors of FIG. 1 and employs the various actuators of FIG. 1 to adjust engine operation based on the received signals and instructions stored on a memory of the controller.

Engine 10 includes combustion chamber 30 and cylinder walls 32 with piston 36 positioned therein and connected to crankshaft 40. Cylinder head 13 is fastened to engine block 14. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. Although in other examples, the engine may operate valves via a single camshaft or pushrods. The position of intake cam 51 may be determined by intake cam sensor 55. The position of exhaust cam 53 may be determined by exhaust cam sensor 57.

Fuel injector 68 is shown positioned in cylinder head 13 to inject fuel directly into combustion chamber 30, which is known to those skilled in the art as direct injection. Fuel is delivered to fuel injector 68 by a fuel system including a fuel tank 26, fuel pump 21, fuel pump control valve 25, and fuel rail (not shown). Fuel pressure delivered by the fuel system may be adjusted by varying a position valve regulating flow to a fuel pump (not shown). In addition, a metering valve may be located in or near the fuel rail for closed loop fuel control. A pump metering valve may also regulate fuel flow to the fuel pump, thereby reducing fuel pumped to a high pressure fuel pump.

Intake manifold 44 is shown communicating with optional electronic throttle 62 which adjusts a position of throttle plate 64 to control air flow from intake boost chamber 46. Compressor 162 draws air from air intake 42 to supply boost chamber 46. Exhaust gases spin turbine 164 which is coupled to compressor 162 via shaft 161. Compressor speed may be adjusted via adjusting a position of variable vane control 78 or compressor bypass valve 158. In alternative examples, a waste gate 79 may replace or be used in addition to variable vane control 78. Variable vane control 78 adjusts a position of variable geometry turbine vanes. Exhaust gases can pass through turbine 164 supplying little energy to rotate turbine 164 when vanes are in an open position. Exhaust gases can pass through turbine 164 and impart increased force on turbine 164 when vanes are in a closed position. Alternatively, wastegate 79, or a bypass valve, allow exhaust gases to flow around turbine 164 so as to reduce the amount of energy supplied to the turbine. Compressor bypass valve 158 allows compressed air at the outlet of compressor 162 to be returned to the input of compressor 162. In this way, the efficiency of compressor 162 may be reduced so as to affect the flow of compressor 162 and reduce the possibility of compressor surge.

Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99 such that starter 96 may rotate crankshaft 40 during engine cranking. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. An engine start may be requested via human/machine interface (e.g., key switch, pushbutton, remote radio frequency emitting device, etc.) 69 or in response to vehicle operating conditions (e.g., brake pedal position, accelerator pedal position, battery SOC, etc.). Battery 8 may supply electrical power to starter 96 and controller 12 may monitor battery state of charge.

Combustion is initiated in the combustion chamber 30 when fuel automatically ignites when combustion chamber temperatures reach the auto-ignition temperature of the fuel when the piston 36 is near top-dead-center compression stroke. In some examples, a universal Exhaust Gas Oxygen (UEGO) sensor 126 may be coupled to exhaust manifold 48 upstream of emissions device 71. In other examples, the UEGO sensor may be located downstream of one or more exhaust after treatment devices. Further, in some examples, the UEGO sensor may be replaced by a NOx sensor that has both NOx and oxygen sensing elements.

At lower engine temperatures a glow plug 66 may convert electrical energy into thermal energy so as to create a hot spot next to one of the fuel spray cones of an injector in the combustion chamber 30. By creating the hot spot in the combustion chamber next to fuel spray, it may be easier to ignite the fuel spray plume in the cylinder, releasing heat that propagates throughout the cylinder, raising the temperature in the combustion chamber, and improving combustion. Cylinder pressure may be measured via pressure sensor 67.

Emissions device 71 can include an oxidation catalyst and it may be followed by a selective catalytic reduction (SCR) catalyst 72 and a diesel particulate filter (DPF) 73, in one example. In another example, DPF 73 may be positioned upstream of SCR 72. Temperature sensor 70 provides an indication of SCR temperature.

Exhaust gas recirculation (EGR) may be provided to the engine via high pressure EGR system 83. High pressure EGR system 83 includes valve 80, EGR passage 81, and EGR cooler 85. EGR valve 80 is a valve that closes or allows exhaust gas to flow from upstream of emissions device 71 to a location in the engine air intake system downstream of compressor 162. EGR may bypass EGR cooler 85, or alternatively, EGR may be cooled via passing through EGR cooler 85. EGR may also be provided via low pressure EGR system 75. Low pressure EGR system 75 includes EGR passage 77 and EGR valve 76. Low pressure EGR may flow from downstream of emissions device 71 to a location upstream of compressor 162. A charge air cooler 163 may be provided downstream of compressor 162. A low pressure EGR cooler may be added to reduce low pressure EGR temperature.

Controller 12 is shown in FIG. 1 as a conventional microcomputer including: microprocessor unit 102, input/output ports 104, read-only memory (e.g., non-transitory memory) 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by human foot 132; a measurement of engine manifold absolute pressure (MAP) from pressure sensor 121 coupled to intake manifold 44; boost pressure from pressure sensor 122 exhaust gas oxygen concentration from oxygen sensor 126; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle.

In a process hereinafter referred to as ignition, the injected fuel is ignited by compression ignition resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

Engine torque may be adjusted via torque actuators including but not limited to throttle 62, fuel injector 68, exhaust camshaft 53, and intake camshaft 51. Engine torque may be adjusted to engine and vehicle operating conditions as described herein.

Figure 2:
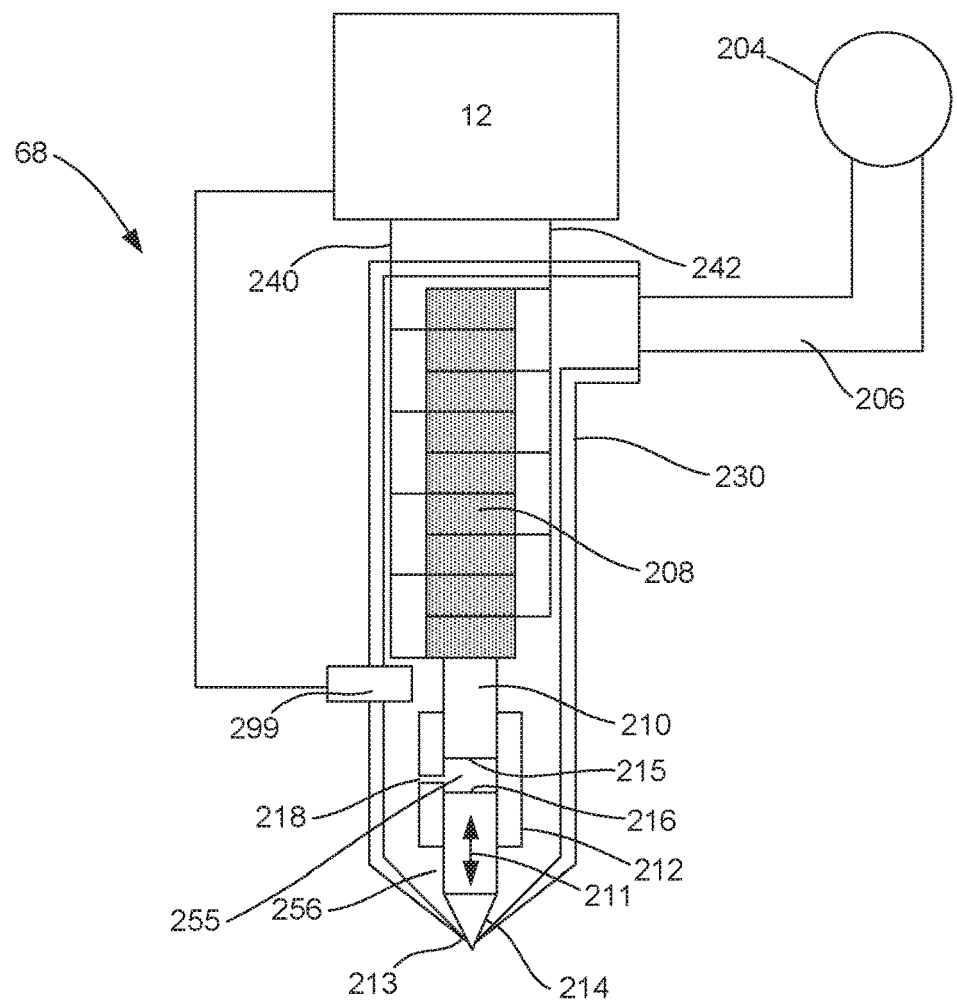
FIG. 2 shows a schematic of an example fuel injector.

Referring now to FIG. 2, a detailed view of direct fuel injector 68 is shown. Direct fuel injector 68 is shown with nozzle needle 214 in a closed position such that fuel is not injected. Opening and closing of direct fuel injector 68 may be commanded via controller 12 applying current to direct fuel injector via conductors 240 and 242. Nozzle needle 214 may move in the directions indicated by arrows 211. Fuel is supplied to direct fuel injector via fuel line 206 and common fuel rail 204. Fuel flows into fuel injector housing 230 where it may flow toward nozzle needle seat 213 when direct fuel injector 68 is commanded open. Piezoelectric actuator 208 may expand when it is supplied current in a first direction, and it may contract when it is supplied current in a second direction. Piezoelectric actuator 208 is in hydraulic communication with nozzle needle 214 via hydraulic coupler 212 and shaft 210. Hydraulic coupler 212 may be filled with fuel so that for rapid changes in the length of piezoelectric actuator 208, force may be applied or released from nozzle needle 214 via pressurized fuel that resides inside of hydraulic coupler 212. Hydraulic coupler 212 also includes a throttle 218 that allows pressure to equalize between area 255 inside of hydraulic coupler 212 and pressure inside 256 of housing 230 for slow pressure changes area 255 that may be due to temperature.

In its closed position (e.g., seated), nozzle needle 214 is in direct contact with nozzle needle seat 213, which prevents fuel flow through direct fuel injector 68. Piezoelectric actuator 208 is charged and in an expanded state which increases pressure within hydraulic coupler 212, thereby forcing nozzle needle 214 to contact nozzle needle seat 213. Piezoelectric actuator 208 contracts when it is discharged so that pressure with hydraulic coupler 212 may be reduced allowing fuel pressure within fuel injector housing 230 to open nozzle needle 214 such that nozzle needle 214 is not in contact with nozzle needle seat 213. Fuel is injected to a cylinder when nozzle needle 214 is displaced from nozzle needle seat 213. It should be understood that the fuel injector shown in FIG. 2 is only one example fuel injector to which the present system and method may be applied. If fuel injector 68 is commanded on for an extended period of time back side 216 of nozzle needle 214 may impact backstop 215 of device or shaft 210, thereby causing nozzle needle 214 to change trajectory. In other injectors, backstop 215 may be another injector component that resides in the path of motion of nozzle needle 214. Fuel injector 68 may also include a nozzle needle position sensor 299 that provides nozzle needle position feedback to controller 12.

Thus, the system of FIGS. 1 and 2 provides for a fuel injection system, comprising: a direct fuel injector including a nozzle needle and a nozzle needle seat; and a controller including executable instructions stored in non-transitory memory that causes the nozzle needle to move in a closing direction without fully closing the fuel injector before moving the nozzle needle in an opening direction. The fuel injection system includes where the direct fuel injector is fully closed when the nozzle needle is in contact with the nozzle needle seat, and further comprising: additional instructions to change a direction of travel of the nozzle needle a plurality of times after opening the direct fuel injector and before fully closing the direct fuel injector. The fuel injection system includes where the direction of the nozzle needle is changed via changing a direction of current flow to the direct fuel injector. The fuel injection system further comprises additional instructions to prevent the nozzle needle from impacting a piezoelectric actuator or a fuel injector component that is between the nozzle needle and the piezoelectric actuator. The fuel injection system further comprises additional instructions to lift the nozzle needle in response to a position of an engine. The fuel injection system further comprises additional instructions to seat the nozzle needle in response to a desired amount of fuel to inject to an engine.

Referring now to FIG. 3, an example prophetic prior art fuel injector operating sequence is shown. The plots of FIG. 3 are time aligned and occur at a same time. Vertical lines at times t0-t10 represent times of interest during the sequence. The double S marks along each of the horizontal axis represent breaks in time that may be long or short in duration. The engine system described herein may operate and include non-transitory instructions to operate at all the conditions included in the descriptions of FIG. 3. The sequence shown describes operation of a fuel injector for cylinder number one of a multi-cylinder engine. The engine's other cylinders and fuel injectors may be operated in a similar manner. The system of FIGS. 1 and 2 may operate as shown in FIG. 3 and the system may issue fuel injector commands as shown in FIG. 3.

The first plot from the top of FIG. 3 represents a fuel injector command versus engine crankshaft position. Trace 302 represents fuel injector command state. The vertical axis represents fuel injector command state and the fuel injector command in this example is a voltage, but it may be represented as a current in other examples. The fuel injector command is issuing a fuel injector open command when trace 302 is above the horizontal axis (e.g., current flowing into the fuel injector in a first direction, needle traveling away from the needle seat). The fuel injector command is issuing a fuel injector close command when trace 302 is below the horizontal axis (e.g., current flowing into the fuel injector in a second direction, the second direction different from the first direction, needle travels toward the needle seat). Once a fuel injector is commanded, the fuel injector operates according to the command (excepting a hydraulic dwell time) until it is commanded otherwise. The fuel injector command is not active when trace 302 is not visible (lying on the vertical axis). The horizontal axis represents engine position and engine position is indicated by strokes of cylinder number one. For example, the engine is on an intake stroke of cylinder number one in regions of the horizontal axis indicated by "intake." The engine is on a compression stroke of cylinder number one in regions of the horizontal axis indicated by "compression" and so on. The engine rotates and its position changes from the left side of FIG. 3 to the right side of FIG. 3.

The second plot from the top of FIG. 3 represents a fuel injector nozzle needle position versus engine crankshaft position. Trace 306 represents actual fuel injector nozzle needle position during conditions where the nozzle needle is not commanded to close before it stays positioned against a backstop. Dash line trace 307 represents fuel injector nozzle needle position if the nozzle needle is commanded to close shortly after the nozzle needle impacts a backstop within the fuel injector. Dash dot trace 308 represents fuel injector nozzle needle position if the nozzle needle is commanded to close at a second time shortly after the nozzle needle impacts the backstop within the fuel injector. The vertical axis represents fuel injector nozzle needle position and the fuel injector nozzle needle position moves away from the nozzle needle seat in the direction of the vertical axis arrow. The nozzle needle is in contact with the nozzle needle seat when trace 306 is at the level of the horizontal axis. The fuel injector nozzle needle is in contact with the nozzle needle seat when the nozzle needle trace 306 is not visible. The horizontal axis represents engine position and engine position is indicated by strokes of cylinder number one. The engine rotates and its position changes from the left side of FIG. 3 to the right side of FIG. 3. Horizontal line 352 represents a needle threshold position above which flow out of the direct fuel injector is at the rated flow rate of the fuel injector. When the nozzle needle position is lower than threshold position 352, flow through the fuel injector is throttled such that flow through the fuel injector is less than the rated flow rate of the fuel injector. Horizontal line 350 represents a nozzle needle threshold position where the nozzle needle contacts a backstop or component within the fuel injector (e.g., a shaft or other device that is coupled to the piezoelectric actuator, or alternatively, the piezoelectric actuator itself) such that the needle may not lift to a higher position.

The third plot from the top of FIG. 3 represents a fuel injector fuel flow rate versus engine crankshaft position. Trace 310 represents fuel injector flow rate. Trace 312 represents fuel injector flow rate if the nozzle needle's motion was not affected by impacting a component within the fuel injector (e.g., a backstop). The vertical axis represents fuel injector flow rate and the fuel injector flow rate increases in the direction of the vertical axis arrow. The fuel injector flow rate is zero when trace 310 is not visible or at the level of the horizontal axis. The horizontal axis represents engine position and engine position is indicated by strokes of cylinder number one.

At time t0, the engine is rotating and cylinder number one is on its intake stroke. The fuel injector is not being commanded and the fuel injector is closed as indicated by the needle position being at the level of the horizontal axis. The flow rate of fuel through the fuel injector is zero. The engine rotates through cylinder number one's intake stroke and into the compression stroke of cylinder number one as time progresses after time t0.

At the time t1, the fuel injector is commanded open via applying a positive voltage to the fuel injector. The piezoelectric actuator deforms (not shown) nearly instantaneously, but the fuel injector needle does not begin to move until time t2. The amount of time between time t1 and time t2 may be referred to as a hydraulic dwell time. The fuel injector flow rate is zero until the needle begins to move at time t2. The fuel injector flow is throttled in this region of fuel injector operation. The fuel injector flow is throttled until the fuel injector nozzle needle position is above threshold 352. The fuel injector nozzle needle position increases linearly between time t2 and time t3 as it moves away from the nozzle needle seat.

At time t3, the controller (e.g., 12 of FIG. 1) issues a command to close the fuel injector as indicated by trace 302 being below the horizontal axis of the first plot from the top of FIG. 3. The fuel injector nozzle needle continues to follow its previous trajectory and the fuel injector flow rate remains at its previous constant value. Thus, the fuel injector nozzle needle is commanded to close before the nozzle needle hits its backstop, the piezoelectric actuator, or a device coupled to the piezoelectric actuator. Shortly after time t3 (e.g., after a hydraulic dwell time), the nozzle needle position reverses direction from opening to closing, while the fuel injector flow rate remains at its previous constant value. The fuel injector flow rate remains constant until the nozzle needle position is lower than threshold position 352 shortly before time t4.

At time t4, the fuel injector nozzle needle contacts the fuel injector nozzle needle seat so that fuel flow through the fuel injector ceases. The fuel injector command is not asserted and the fuel flow rate is zero. Thus, when a smaller amount of fuel is injected via the fuel injector, the fuel injector nozzle needle trajectory is linear and the fuel injector nozzle needle opens (e.g., moves away from the needle seat) at a constant rate and the fuel injector nozzle needle closes at a constant rate. The events between time t1 and time t4 are part of a sole fuel pulse.

At time t5, the engine continues rotating and cylinder number one is on its compression stroke. The fuel injector is commanded open via applying a positive voltage to the fuel injector to provide a second fuel injection or fuel pulse. The piezoelectric actuator expands, but the fuel injector nozzle needle does not begin to move until time t6. The fuel injector flow rate is zero until the nozzle needle begins to move at time t6. The fuel injector flow is throttled in this region of fuel injector operation. The fuel injector flow is throttled again until the fuel injector needle is above threshold 352. The fuel injector nozzle needle position increases linearly between time t6 and time t7 as it moves away from the nozzle needle seat.

At time t7, the fuel injector nozzle needle impacts the backstop, piezoelectric actuator, or device that is in communication with the piezoelectric actuator as indicated by trace 306 reaching threshold 350. The fuel injector has not been commanded closed since a longer fuel injection is desired to increase the amount of fuel supplied during the fuel injection event. The fuel injector flow remains at a constant value. The fuel injector nozzle needle position decreases after the fuel injector nozzle needle impacts the backstop as indicated by trace 306; however, if the fuel injector nozzle needle were able to stop at the backstop, then the fuel injector nozzle needle position would follow the backstop. If the fuel injector were commanded closed at time t8 shortly after the nozzle needle impacts the backstop within the fuel injector, then the fuel injector would close at time t11 such that the fuel flow would be zero at time t11. If the fuel injector was commanded closed at time t9, roughly double the time since t7, then the fuel injector would closed at time t12, which does not increase the amount of fuel injected proportionately with the time between when the fuel injector was commanded open and the time when the fuel injector was commanded closed. Thus, doubling the amount of time from time t7 to time t9, as compared to the amount of time between time t7 and time t8, results in almost no additional fuel being injected to the cylinder. Such operation makes delivery of consistent accurate amounts of fuel difficult. In this example, the fuel injector is actually commanded closed at time t10, which results in the fuel injector closing at time t13.

Accordingly, if the amount of fuel desired to be injected is greater than a threshold amount and the injector is commanded open for a duration that allows the fuel injector nozzle needle to impact the backstop (e.g., piezoelectric actuator, throttle plate, or device in communication with the piezoelectric actuator), then the actual amount of fuel injected may deviate from the desired amount of fuel to be injected. If the nozzle needle impacts the backstop, it may be difficult to determine the nozzle needle's position so that the fuel injector may be closed at a time that provides the desired amount of fuel to be injected.

Referring now to FIG. 4, a prophetic fuel injector operating sequence according to the present method is shown. The plots of FIG. 4 are time aligned and occur at a same time. Vertical lines at times t20-t30 represent times of interest during the sequence. The double S marks along each of the horizontal axis represent breaks in time that may be long or short in duration. The engine system described herein may operate and include non-transitory instructions to operate at all the conditions included in the descriptions of FIG. 4. The sequence shown describes operation of cylinder number one of a multi-cylinder engine. The engine's other cylinders are operated in a similar manner. The system of FIGS. 1 and 2 may operate as shown in FIG. 4 and the system may issue fuel injector commands as shown in FIG. 4.

The first plot from the top of FIG. 4 represents a fuel injector command versus engine crankshaft position. Trace 402 represents fuel injector command state. The vertical axis represents fuel injector command state and the fuel injector command in this is a voltage, but it may be represented as a current in other examples. The fuel injector command is issuing a fuel injector open command when trace 402 is above the horizontal axis. The fuel injector command is issuing a fuel injector close command when trace 402 is below the horizontal axis. The fuel injector command is not active when trace 402 is not visible (lying on the vertical axis). The horizontal axis represents engine position and engine position is indicated by strokes of cylinder number one. The engine rotates and its position changes from the left side of FIG. 4 to the right side of FIG. 4.

The second plot from the top of FIG. 4 represents a fuel injector nozzle needle position versus engine crankshaft position. Trace 406 represents actual fuel injector nozzle needle position. The vertical axis represents fuel injector nozzle needle position and the fuel injector nozzle needle position moves away from the needle seat in the direction of the vertical axis arrow. The nozzle needle is in contact with the needle seat when trace 406 is at the level of the horizontal axis. The fuel injector nozzle needle is in contact with the nozzle needle seat when the nozzle needle trace 406 is not visible. The horizontal axis represents engine position and engine position is indicated by strokes of cylinder number one. The engine rotates and its position changes from the left side of FIG. 4 to the right side of FIG. 4. Horizontal line 452 represents a nozzle needle threshold position above which flow out of the direct fuel injector is at the rated flow rate of the fuel injector. When the nozzle needle position is lower than threshold position 452, flow through the fuel injector is throttled such that flow through the fuel injector is less than the rated flow rate of the fuel injector. Horizontal line 450 represents a nozzle needle threshold position where the nozzle needle contacts a backstop or component within the fuel injector (e.g., a shaft or other device that is coupled to the piezoelectric actuator, or alternatively, the piezoelectric actuator itself) such that the needle may not lift to a higher position.

The third plot from the top of FIG. 4 represents a fuel injector fuel flow rate versus engine crankshaft position. Trace 410 represents fuel injector flow rate. The vertical axis represents fuel injector flow rate and the fuel injector flow rate increases in the direction of the vertical axis arrow. The fuel injector flow rate is zero when trace 410 is not visible or at the level of the horizontal axis. The horizontal axis represents engine position and engine position is indicated by strokes of cylinder number one.

At time t20, the engine is rotating and cylinder number one is on its intake stroke. The fuel injector is not being commanded and the fuel injector is closed as indicated by the nozzle needle position being at the level of the horizontal axis. The flow rate of fuel through the fuel injector is zero. The engine rotates through cylinder number one's intake stroke and into the compression stroke of cylinder number one.

At the time t21, the fuel injector is commanded open to lift the nozzle needle from the nozzle needle seat via applying a positive voltage to the fuel injector. The piezoelectric actuator expands (not shown) nearly instantaneously, but the fuel injector nozzle needle does not begin to move until time t22. The amount of time between time t21 and time t22 may be referred to as a hydraulic dwell time. The fuel injector flow rate is zero until the nozzle needle begins to move at time t22. The fuel injector flow is throttled (e.g., flow through the fuel injector is less than the rated flow rate of the fuel injector, where the rated flow rate of the fuel injector is the rate of fuel flow through the injector when the injector is fully open and fuel is supplied to the fuel injector at a predetermined pressure) in this region of fuel injector operation. The fuel injector flow is throttled until the fuel injector nozzle needle is above threshold 452. The fuel injector nozzle needle position increases linearly between time t22 and time t23 as it moves away from the nozzle needle seat.

At time t23, the controller (e.g., 12 of FIG. 1) issues a command to close the fuel injector as indicated by trace 402 being below the horizontal axis of the first plot from the top of FIG. 4. The fuel injector nozzle needle continues to follow its previous trajectory and the fuel injector flow rate remains at its previous constant value. Thus, the fuel injector nozzle needle is commanded to close before the nozzle needle hits its backstop, the piezoelectric actuator, or a device coupled to the piezoelectric actuator. Shortly after time t23 (e.g., after a hydraulic dwell time), the nozzle needle position reverses direction from opening to closing, while the fuel injector flow rate remains at its previous constant value. The fuel injector flow rate remains constant until the nozzle needle position is lower than threshold position 452 shortly before time t24.

At time t24, the fuel injector nozzle needle contacts the fuel injector nozzle needle seat so that fuel flow through the fuel injector ceases. The fuel injector command is not asserted and the fuel flow rate is zero. Thus, when a smaller amount of fuel is injected via the fuel injector, the fuel injector nozzle needle trajectory is linear and the fuel injector nozzle needle opens (e.g., moves away from the needle seat) at a constant rate and the fuel injector needle closes at a constant rate. The events between time t21 and time t24 are part of a single fuel injection event.

At time t25, the engine continues rotating and cylinder number one is on its compression stroke and a second fuel injection begins. The fuel injector is commanded open via applying a positive voltage to the fuel injector to provide a second fuel injection. The piezoelectric actuator expands, but the fuel injector nozzle needle does not begin to move until time t26. The fuel injector flow rate is zero until the nozzle needle begins to move at time t26. The fuel injector flow is throttled in this region of fuel injector operation. The fuel injector flow is throttled again until the fuel injector nozzle needle is above threshold 452. The fuel injector nozzle needle position increases linearly between time t26 and time t27 as it moves away from the needle seat.

At time t27, the fuel injector is commanded closed a first time since fuel started to flow through the fuel injector most recently. The fuel injector is commanded closed before the nozzle needle impacts the backstop, piezoelectric actuator, or device that is between the nozzle needle and the piezoelectric actuator. Shortly thereafter, the hydraulic dwell time elapses and the fuel injector nozzle needle reverses direction and it begins to move toward the nozzle needle seat. The flow through the injector remains constant at the fuel injector's rated flow rate. By not allowing the fuel injector nozzle needle to hit the backstop, the trajectory of the fuel injector nozzle needle may be known or estimated.

At time t28, the fuel injector is commanded open a second time since the injector began to inject fuel most recently. The fuel injector is commanded open before the fuel injector nozzle needle position is less than threshold 452 so that the fuel injector remains flowing the rated amount of fuel through the fuel injector. Thus, the amount of fuel injected between time t27 and time t28 is constant. The fuel injector nozzle needle reverses direction and begins to travel away from the nozzle needle seat. Thus, the nozzle needle position is maintained between threshold 450 and threshold 452 so that fuel flow through the fuel injector remains constant.

At time t29, the fuel injector is commanded closed for a second time since the fuel injector began to inject fuel most recently. The fuel injector is commanded closed before the fuel injector nozzle needle hits the backstop and threshold 450 so that the fuel injector remains flowing the rated amount of fuel through the fuel injector and so that the nozzle needle trajectory is not changed by impacting the backstop. Thus, the amount of fuel injected between time t27 and time t29 is constant. The fuel injector nozzle needle reverses direction and begins to travel toward the nozzle needle seat. The nozzle needle travels toward the nozzle needle seat until the injector fully closes when the nozzle needle contacts the nozzle needle seat at time t30.

The second fuel injection from time t25 to time t30 is a fuel injection that is longer in duration than the first fuel injection shown between times t21 and time t24. Further, the fuel injection from time t25 is a sole fuel injection pulse width and the fuel injection is not affected by impacting the backstop within the fuel injector. Consequently, the fuel injection duration may be more repeatable and more accurate. The second fuel injection pulse from time t25 to time t30 is produced via two fuel injector open commands and two fuel injector close commands; however, the fuel injector duration may be extended for as long as a period as is desired by increasing the actual total number of fuel injector open commands and fuel injector close commands without the fuel injector impacting the backstop or changing the flow rate through the fuel injector by the nozzle needle position being closer to the nozzle needle seat than threshold 452. As a result, a sole fuel injection pulse may be provided such that the amount of fuel delivered meets a desired amount of fuel.

Referring now to FIG. 5, a method for operating an engine and fuel injector is shown. The method of FIG. 5 may be stored as executable instructions in non-transitory memory in systems such as shown in FIG. 1. The method of FIG. 5 may be incorporated into and may cooperate with the systems of FIG. 1. Further, at least portions of the method of FIG. 5 may be incorporated as executable instructions stored in non-transitory memory while other portions of the method may be performed via a controller transforming operating states of devices and actuators in the physical world. The controller may employ engine actuators of the engine system to adjust engine operation, according to the method described below. Further, method 500 may determine selected control parameters from sensor input. Further, controller instructions may be provided for operating an engine at all the engine operating conditions described herein.

At 502, method 500 determines vehicle operating conditions. Vehicle operating conditions may include, but are not limited to engine position, engine temperature, ambient air temperature, and driver demand torque. Method 500 may determine the vehicle operating conditions via the various sensors and actuators described herein. Method 500 proceeds to 504.

At 504, method 500 determines a desired amount of fuel to inject for a main fuel pulse during a cycle of a cylinder. In one example, method 500 receives a driver demand torque input from an accelerator pedal and an engine speed measurement. A table of empirically determined fuel injection amounts is indexed or referenced via the driver demand torque and the engine speed. The table then outputs a main fuel injection fuel amount that is the basis for commanding one or more fuel injectors of the engine. Method 500 proceeds to 506 after determining the main fuel injection fuel amount.

At 506, method 500 judges if the main fuel injection fuel amount is greater than a threshold fuel amount. The threshold fuel amount may be an amount of fuel that causes a fuel injector pulse width to exceed a threshold value. A fuel injector pulse width that is greater than the threshold value may cause the fuel injector's nozzle needle to impact the fuel injector's backstop if the fuel injector is commanded on only once to provide the main fuel injection amount. If method 500 judges that the main fuel injection amount is greater than the threshold fuel amount, the answer is yes and method 500 proceeds to 508. Otherwise, the answer is no and method 500 proceeds to 520.

At 520, method 500 determines a fuel injector pulse width for the main fuel injection during a cycle of a cylinder. The main fuel injection fuel amount may be converted into a fuel injector pulse width or fuel injector on time via a function (e.g., a transfer function) that translates the main fuel injection fuel amount into a fuel injector pulse width. The values in the function may be based on the fuel injector's rated flow rate. Method 500 references the table or function and the table or function outputs the fuel injector pulse width. Method 500 proceeds to 522.

At 522, method 500 determines a half period time for the fuel pulse width determined at 520. The half period is determined by dividing the fuel injection pulse width value determined at 520 by two. The half period value is determined so that timing for the fuel injector close command may be determined. Method 500 proceeds to 524.

At 524, method 500 determines the start of fuel injection time. In one example, method 500 determines the start of fuel injection time via indexing or referencing a table or function of empirically determined start of fuel injection times. The values in the table may be determined via adjusting start of injection times and observing engine emissions, power, and noise. The table may be referenced via engine speed and driver demand torque. The start of fuel injection time is the timing of the fuel injector on or open command without compensation for the fuel injector hydraulic dwell. Method 500 proceeds to 526.

At 526, method 500 adjusts the start of fuel injection time for the fuel injector's hydraulic dwell time. For example, if the start of injection time for the main fuel injection is 30 crankshaft degrees before top dead center (BTDC) compression stroke of the cylinder receiving the fuel and the hydraulic dwell time is 50 microseconds, then the fuel injector open command is adjusted to 50 microseconds before 30 crankshaft degrees BTDC compression stroke of the cylinder receiving the fuel so that fuel begins to exit the fuel injector 30 crankshaft degrees BTDC compression stroke of the cylinder receiving the fuel. The fuel injector off or close command is adjusted to 30 BTDC compression stroke of the cylinder receiving the fuel plus the fuel injection half period time determined at 522 minus the hydraulic dwell time of the fuel injector. In this way, the fuel injector on command and the fuel injector off command are adjusted to compensate for the hydraulic dwell time of the fuel injector. Method 500 proceeds to 528.

At 528, the fuel injector of a cylinder is commanded on once for the main fuel injection pulse during a cycle of the cylinder receiving the fuel at the time determined at 526. The same fuel injector is commanded off once for the main fuel injection pulse during the cycle of the cylinder at the fuel injector off command time determined at 526. Method 500 proceeds to exit.

The fuel injectors of each cylinder may be commanded on and off in this way when smaller amounts of fuel are desired to meet driver demand torque. Injection of fuel in this way is shown between time t21 and time t24 of FIG. 4.

At 508, method 500 determines a fuel injector pulse width for the main fuel injection during a cycle of a cylinder. The main fuel injection fuel amount may be converted into a fuel injector pulse width or fuel injector on time via a function (e.g., a transfer function) that translates the main fuel injection fuel amount into a fuel injector pulse width. The values in the function may be based on the fuel injector's rated flow rate. Method 500 references the table or function and the table or function outputs the fuel injector pulse width. Method 500 proceeds to 510.

At 510, method 500 determines the start of fuel injection time. In one example, method 500 determines the start of fuel injection time via indexing or referencing a table or function of empirically determined start of fuel injection times. The values in the table may be determined via adjusting start of injection times and observing engine emissions, power, and noise. The table may be referenced via engine speed and driver demand torque. The start of fuel injection time is the timing of the fuel injector on or open command without compensation for the fuel injector hydraulic dwell. Method 500 proceeds to 512.

At 512, method 500 adjusts the start of fuel injection time for the fuel injector's hydraulic dwell time. For example, if the start of injection time for the main fuel injection is 30 crankshaft degrees before top dead center (BTDC) compression stroke of the cylinder receiving the fuel and the hydraulic dwell time is 50 microseconds, then the fuel injector open command is adjusted to 50 microseconds before 30 crankshaft degrees BTDC compression stroke of the cylinder receiving the fuel so that fuel begins to exit the fuel injector 30 crankshaft degrees BTDC compression stroke of the cylinder receiving the fuel. Method 500 proceeds to 514.

Method 500 may also adjust the start of fuel injection time in response to feedback from the nozzle position sensor 299 shown in FIG. 2. For example, the fuel injector start of fuel injection time may be adjusted in response to a difference between a desired fuel injector opening time and a fuel injector opening time as determined from the fuel injector nozzle position sensor.

At 514, method 500 operates the fuel injector supplying fuel to a cylinder via commanding the fuel injector open and closed repeatedly during a cycle of the cylinder so that the fuel injection pulse width determined at 508 is delivered via the fuel injector. In one example, the fuel injector's needle position rate of change for a fuel injector open command is stored in controller memory. Further, the fuel injector's needle position rate of change for a fuel injector close command is stored in controller memory. The fuel injection pulse width determined at 508 is then partitioned into sections where the fuel injector is commanded open and sections where the fuel injector is commanded closed (e.g., t25-t26, t26-t27, t27-t28 of FIG. 4). The durations of the sections may be a function of the total fuel injection pulse width, the fuel injector's needle position rate of change for a fuel injector close command, and the fuel injector's needle position rate of change for a fuel injector open command. A fuel injector open or fuel injection close command is assigned for each section of the fuel injection pulse width (e.g., the fuel injection pulse width determined at 508). The fuel injector on and off command times may be adjusted via subtracting the fuel injector's hydraulic dwell time from the fuel injector commanded on and off times.

Thus, the fuel injector is commanded open and closed a plurality of times in a cylinder cycle. The fuel injector is also commanded open and closed a plurality of times to provide a sole main fuel pulse width of an extended duration. The fuel injector is commanded closed before the fuel injector's needle hits the backstop within the fuel injector. The fuel injector is commanded open, after the fuel injector is commanded open a first time t0 generate a fuel pulse width, before the fuel injector needle reaches a position where flow through the fuel injector is throttled via the needle. In this way, the fuel injector may be commanded open and closed multiple times to provide a sole main fuel pulse width during a cylinder cycle as shown in FIG. 4 between times t25 and t30. The fuel injector nozzle needle may change direction a plurality of times when the fuel injector is commanded open and closed a plurality of times to provide the extended fuel pulse width duration.

Method 500 may also adjust the fuel injector opening and closing command times in response to feedback from the nozzle position sensor 299 shown in FIG. 2. For example, the fuel injector opening command time may be adjusted in response to a difference between a desired fuel injector opening time and a fuel injector opening time command as determined from output of the fuel injector nozzle position sensor. Likewise, the fuel injector closing command time may be adjusted in response to output from the fuel injector nozzle needle position sensor. Method 500 proceeds to exit.

In this way, multiple commands may be issued to a fuel injector so that the fuel injector's needle avoids impact with a backstop within the fuel injector and avoids the fuel injector's throttled flow operating regions (except when the fuel injector is initially opened and finally closed during generation of a single fuel pulse width). The actual total number of on and off commands issued to a fuel injector to provide a single fuel pulse width for a cycle of a cylinder may be greater than two off commands and two on commands.

Thus, the method of FIG. 5 provides for a fuel injector operating method, comprising: commanding a fuel injector open a plurality of times before contacting a nozzle needle with a needle seat during a cycle of a cylinder. The fuel injector method further comprising commanding the fuel injector closed a plurality of times before contacting the nozzle needle with the needle seat. The fuel injector method includes where the nozzle needle is commanded closed each of the plurality of times before the nozzle needle impacts a device that is between the nozzle needle and the piezoelectric actuator. The fuel injector method includes where the fuel injector is commanded closed via flowing a first current in a first direction between a controller and a piezoelectric actuator of the fuel injector. The fuel injector method includes where the fuel injector is commanded open via supplying flowing a second current in a second direction between the controller and the piezoelectric actuator of the fuel injector. The fuel injector method includes where the nozzle needle is in an open state and not contacting the nozzle needle seat. The fuel injector method includes where contacting the nozzle needle with the nozzle needle seat substantially stops (e.g., less than 2% of the fuel injectors rated flow rate at a predetermined fuel pressure) fuel flow through the fuel injector and further comprising: adjusting timing of commanding the fuel injector in response to output of a position sensor. The fuel injector method includes where commanding the fuel injector open the plurality of times causes diesel fuel to flow directly into an engine cylinder.

The method of FIG. 5 also provides for a fuel injector operating method, comprising: lifting a nozzle needle from a nozzle needle seat and changing a direction of motion of the nozzle needle a plurality of times before contacting the nozzle needle with the needle seat during a cycle of a cylinder. The fuel injector method further comprises maintaining a position of the nozzle needle above a position where flow through the fuel injector is throttled to less than a rated flow rate of the fuel injector between an initial opening command of the fuel injector and a final closing command of the fuel injector, the initial opening command and the final closing command defining a duration of a fuel injection pulse during a cylinder cycle. The fuel injector method includes where the changing direction of the nozzle needle includes flowing current to the fuel injector in a first direction and in a second direction. The fuel injector method further comprises changing the direction of the nozzle needle without impacting the nozzle needle to a piezoelectric actuator or a device that is between the nozzle needle and the piezoelectric actuator. The fuel injector method includes where the nozzle needle is in fluidic communication with a piezoelectric actuator. The engine method includes where the nozzle needle is lifted via output of a controller.

Referring now to FIG. 6, a plot of fuel injection quantity versus fuel injector energizing time (e.g., time the fuel injector is commanded to inject fuel) is shown. The vertical axis represents the quantity of fuel injected via the fuel injector and the quantity of fuel increases in the direction of the vertical axis arrow. The horizontal axis represents the fuel injector energizing time. Solid line 602 shows the relationship between fuel injection quantity and fuel injector energizing time for an injector that is commanded open and closed only once to provide a single or sole fuel pulse. Dashed line 604 shows the relationship between fuel injection quantity and fuel injector energizing time for an injector that is commanded open and closed a plurality of times to provide a single or sole fuel pulse. Solid line 602 and dashed line 604 overlap where dashed line 604 is not visible.

It may be observed that quantity of fuel injected increases linearly for dashed line 604, whereas the quantity of fuel injected for solid line 602 increases linearly until a particular amount of fuel is injected, then the fuel injection quantity is non-linear. The method of FIG. 5 operates the fuel injector according to dashed line 604. The prior art method operates the fuel injector according to solid line 602. Thus, when larger amounts of fuel are desired to be injected, the injected fuel quantity may be linearly increased by applying the method of FIG. 5.

Consequently, during a single fuel injection during a cylinder cycle where the fuel injector is commanded open a plurality of times and commanded closed a plurality of times; the injected fuel quantity is proportional to or a function of a sum of the closing command times minus the sum of the opening command times. For example, in FIG. 4, the fuel injection quantity is proportional to the time t27+t29 minus the time of t25+t28.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A fuel injector operating method, comprising:
moving a nozzle needle into contact with a nozzle needle seat by commanding a fuel injector open a plurality of times during a cycle of a cylinder,
wherein the fuel injector is commanded open each of the plurality of times by applying a first current to a piezoelectric actuator of the fuel injector via an electronic engine controller, and
wherein a timing for commanding the fuel injector open the plurality of times is based on a predetermined fuel injection pulse width that has been partitioned into sections.

2. The fuel injector method of claim 1, further comprising moving the nozzle needle into contact with the nozzle needle seat by commanding the fuel injector closed a plurality of times via the controller before the nozzle needle is moved into contract with the nozzle needle seat.

3. The fuel injector method of claim 2, where the nozzle needle is commanded closed each of the plurality of times before the nozzle needle is moved into contact with the nozzle needle seat by applying a second current to the actuator in a second direction via the controller.

4. The fuel injector method of claim 2, where the controller commands the fuel injector closed via applying a second current to the actuator of the fuel injector, wherein the first current is applied in a first direction, and wherein the second current is applied in a second direction.

5. The fuel injector method of claim 1, where the nozzle needle is in an open state when the nozzle needle is not contacting the nozzle needle seat.

6. The fuel injector method of claim 1, where contacting the nozzle needle with the nozzle needle seat substantially stops fuel flow through the fuel injector, and further comprising:
adjusting timing of commanding the fuel injector in response to output of a position sensor.

7. The fuel injector method of claim 1, where commanding the fuel injector open the plurality of times causes diesel fuel to flow directly into an engine cylinder, and where an injected fuel quantity is proportional to or a function of a sum of the closing command times minus a sum of the opening command times for a plurality of fuel injector commands.

8. A fuel injector operating method, comprising:
lifting a nozzle needle from a nozzle needle seat via a piezoelectric actuator and changing a direction of motion of the nozzle needle a plurality of times before contacting the nozzle needle with the nozzle needle seat during a cycle of a cylinder, wherein the plurality of times is three or fewer times, and wherein the piezoelectric actuator is supplied current by the electronic engine controller.

9. The fuel injector method of claim 8, further comprising maintaining a position of the nozzle needle above a position where flow through the fuel injector is throttled to less than a rated flow rate of the fuel injector between an initial opening command of the fuel injector and a final closing command of the fuel injector, the initial opening command and the final closing command defining a duration of a fuel injection pulse during the cylinder cycle.

10. The fuel injector method of claim 8, where the changing direction of motion of the nozzle needle includes flowing current to the fuel injector in a first direction and in a second direction.

11. The fuel injector method of claim 10, further comprising changing the direction of motion of the nozzle needle without impacting the nozzle needle to a piezoelectric actuator or a device that is between the nozzle needle and the piezoelectric actuator.

12. The fuel injector method of claim 8, where the nozzle needle is lifted via output of a controller.

13. A fuel injection system, comprising:
a direct fuel injector including a nozzle needle and a nozzle needle seat; and
an electronic engine controller including executable instructions stored in non-transitory memory that cause the nozzle needle to transition from moving in an opening direction to moving in a closing direction without fully closing the direct fuel injector before moving the nozzle needle in the opening direction again, the direct fuel injector transitioned from moving in the opening direction to moving in the closing direction based on a needle position rate of change to prevent the nozzle needle from impacting a piezoelectric actuator or a device that is between the nozzle needle and the piezoelectric actuator.

14. The fuel injection system of claim 13, where the direct fuel injector is fully closed when the nozzle needle is in contact with the nozzle needle seat, and further comprising:
additional instructions to change a direction of motion of the nozzle needle a plurality of times after opening the direct fuel injector and before fully closing the direct fuel injector.

15. The fuel injection system of claim 14, where the direction of motion of the nozzle needle is changed via changing a direction of current flow to the direct fuel injector.

16. The fuel injection system of claim 14, further comprising additional instructions to lift the nozzle needle in response to a position of an engine.

17. The fuel injection system of claim 13, further comprising additional instructions to seat the nozzle needle in response to a desired amount of fuel being injected to an engine.

* * * * *